United States Patent [19]

Okuni et al.

[11] 4,228,336
[45] Oct. 14, 1980

[54] METHOD OF MANUFACTURING STAY RING FOR WATER TURBINE AND PUMP TURBINE

[75] Inventors: Tetsuo Okuni; Masao Ishihara; Takeshi Wada, all of Hitachi, Japan

[73] Assignee: Hitachi, Ltd., Tokyo, Japan

[21] Appl. No.: 911,081

[22] Filed: May 31, 1978

[30] Foreign Application Priority Data

Jun. 7, 1977 [JP] Japan .................................. 52-66243

[51] Int. Cl.³ ............................................. B23K 25/00
[52] U.S. Cl. ................................ 219/73.1; 219/73.11; 219/76.11
[58] Field of Search ............... 219/73.1, 137 R, 73.11, 219/76.1; 415/219 C, 219 B; 29/156.8 R

[56] References Cited

U.S. PATENT DOCUMENTS

| | | | |
|---|---|---|---|
| 1,615,686 | 1/1927 | Eschholz | 219/137 R |
| 1,938,382 | 12/1933 | Haigh | 219/137 R X |
| 2,611,578 | 9/1952 | Biggs | 415/219 C |
| 3,550,259 | 12/1970 | Smith | 219/73.1 X |
| 4,130,931 | 12/1978 | Norcross | 219/73.1 X |

Primary Examiner—E. A. Goldberg
Attorney, Agent, or Firm—Thomas E. Beall, Jr.

[57] ABSTRACT

A method of manufacturing a stay ring for a water turbine or pump turbine having an upper annular disc, a lower annular disc and a plurality of circumferentially equal-distantly spaced stay vanes extending between the upper and lower annular discs. The method includes forming openings in the upper and lower annular discs at locations where the stay vanes are to be positioned, locating the upper and the lower annular discs such that the openings in the upper and lower annular discs are put in vertical alignment, placing a plurality of molds each having therein a space of a shape conforming to that of the stay vane, such that the spaces in the molds are brought into communication with respective pairs of openings of the upper and the lower discs, and effecting an electroslag welding in the space in each mold through respective openings of the upper annular disc to fill the space with the welding metal, thereby to form the stay vanes and, at the same time, to connect the upper and lower annular discs through thus formed stay vanes.

9 Claims, 13 Drawing Figures

METHOD OF MANUFACTURING STAY RING FOR WATER TURBINE AND PUMP TURBINE

BACKGROUND OF THE INVENTION

1. Field of the Invention

The present invention relates to a method of manufacturing stay rings for water turbines or pump turbines and, more particularly, to a method of manufacturing stay rings suitable for use in water turbines adapted to be used under a large water head or fall.

2. Description of the Prior Arts

The stay ring incorporated in water turbines and pump turbines usually has an upper annular disc and a lower annular discs axially spaced from each other and a plurality of circumferentially equi-distantly spaced stay vanes each of which extending between the upper and lower annular discs.

According to the conventional method of manufacturing such a type of stay ring, the upper and the lower annular discs and the stay vanes are fabricated separately. Then, after correctly locating the stay vanes between the upper and the lower annular discs, welding is effected along the peripheries of the upper and lower ends of the stay vanes, so as to rigidly connect the vanes to the upper and lower annular discs.

However, this conventional method is extremely inefficient and cannot suitably be applied to the manufacture of stay rings of water turbines intended for use under a large water head or fall. This is because the distance between the upper and the lower annular discs is too small, in such a type of stay ring. In fact, in some cases, the distance between two annular discs at the inner peripheries of these rings is as small as 28 cm, for example. Thus, it is extremely difficult to effect a satisfactory welding by inserting the welding instruments into the limited space between the upper and the lower annular discs. Therefore, the desired quality of the welded parts can hardly be obtained and, moreover, it is often experienced that the welding itself cannot be carried out.

SUMMARY OF THE INVENTION

It is therefore a major object of the invention to provide a method of manufacturing stay rings for water turbines and pump turbines, capable of ensuring a good quality of the welded construction, irrespective of the distance between the upper and the lower annular discs.

To this end, according to the invention, there is provided a method of manufacturing a stay ring for use in a water turbine and a pump turbine, the stay ring having upper and lower annular discs and a plurality of circumferentially spaced stay vanes each extending between the upper and the lower annular discs, comprising the steps of: forming openings in at least the upper annular disc of the upper and lower annular discs at locations where the stay vanes are to be positioned; locating the upper and lower annular discs in a spaced relation to each other with a predetermined distance therebetween; placing a plurality of molds each having therein a space of a shape conforming to the shape of the stay vane, at predetermined positions between the upper and lower annular discs such that the spaces in the molds are held in communication with the corresponding openings in the upper annular disc; effecting an electroslag welding in each of the spaces in the molds through the associated opening in the upper annular disc to fill the space in the mold with the molten metal; cooling and solidifying the molten metal filling the spaces in the molds to form the stay vanes and, at the same time, to connect the upper and lower annular discs to each other through thus formed stay vanes; and removing the molds from the stay vanes respectively.

The above and other objects, as well as advantageous features of the invention will become more clear from the following description of the preferred embodiments taken in conjunction with the accompanying drawings in which:

DESCRIPTION OF THE PREFERRED EMBODIMENTS

Figure 1:
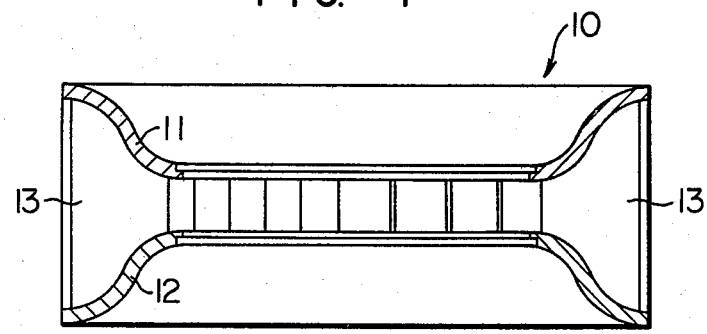
FIG. 1 is a cross-sectional view of completed stay ring.
Figure 2:
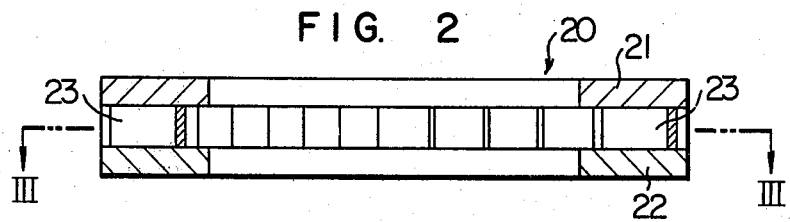
FIG. 2 is a cross-sectional view of another type of stay ring in completed form.
Figure 3:
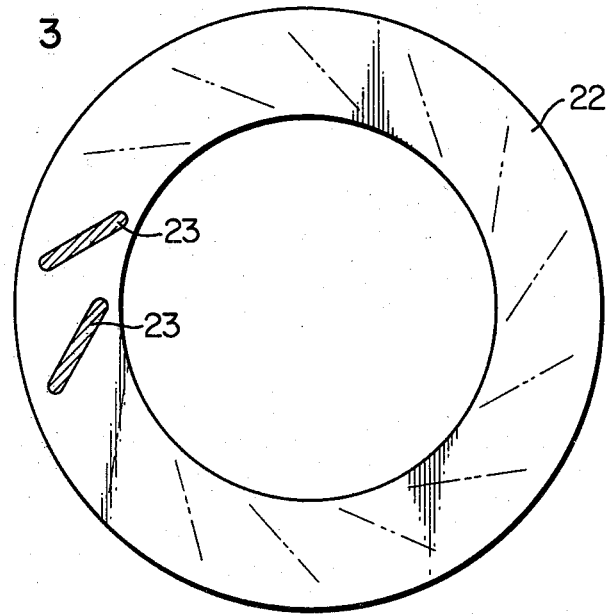
FIG. 3 is a sectional view taken along the line III—III of FIG. 2.

FIGS. 1 to 3 show examples of completed stay rings. Referring first to FIG. 1, a stay ring generally designated at a reference numeral 10 is shown to have an upper annular disc 11, a lower annular disc 12 axially spaced from the upper annular disc 11 and a plurality of circumferentially equi-distantly spaced stay vanes 13 each of which extends between the upper and the lower annular discs 11, 12.

FIGS. 2 and 3 show another stay ring generally denoted by a reference numeral 20. This stay ring 20 has an upper annular ring 21, a lower annular ring 22 axially spaced from the upper annular disc 21 and extending in parallel with the latter and a plurality of circumferentially equi-distantly spaced stay vanes 23 each of which extends between the upper and the lower annular discs 21, 22.

The stay ring 10 as shown in FIG. 1 can be manufactured substantially by the same method as that for the stay ring 20 as shown in FIGS. 2 and 3. In this specification, therefore, preferred methods of manufacturing the stay ring as shown in FIGS. 2 and 3 will be described exemplarily.

According to a method of the invention, at first openings are formed through the thickness of the upper annular disc 21 at locations where the stay vanes 23 are to be placed. These openings are intended for allowing a guide nozzle of an electroslag welder to be inserted into the space in a later-mentioned mold. Thus, any shape of the opening which allows the insertion of the guide nozzle therethrough is acceptable.

Figure 4A:
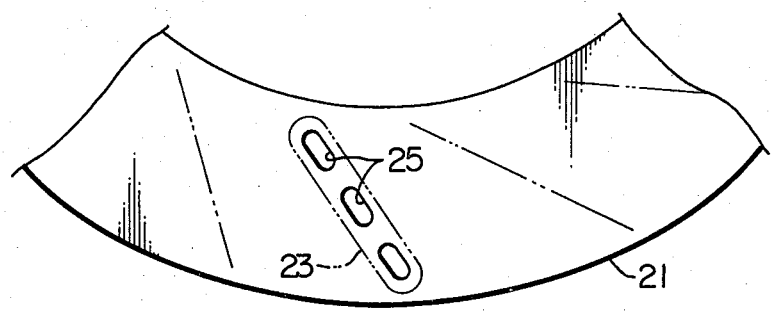
FIGS. 4A to 4C are partial plan views of an upper annular disc, showing different forms of openings formed in the upper annular disc.
Figure 4B:
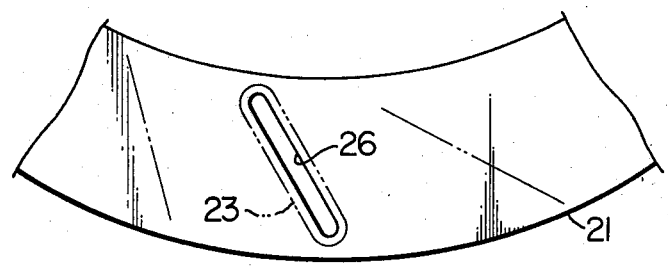

In an example as shown in FIG. 4A, the openings are in the form of a plurality of apertures 25, while, in another example as shown in FIG. 4B, each of the openings consists of an elongated bore or a slot 26 having a shape similar to the cross-sectional shape of the vane 23 but slightly smaller than the latter. In still another example as shown in FIG. 4C, each of the openings is formed as a slot 27 of a shape and size well conforming to those of the cross-section of the stay vane 23.

Figure 4C:
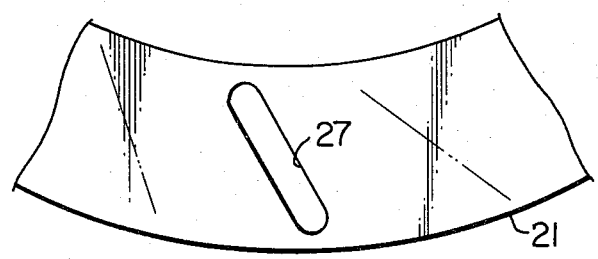

The methods of the invention will be described hereinafter with specific reference to the form of the opening 27 as shown in FIG. 4C, by way of example, although the methods are equally applicable to the forms of openings as shown in FIGS. 4A and 4B.

Figure 5:
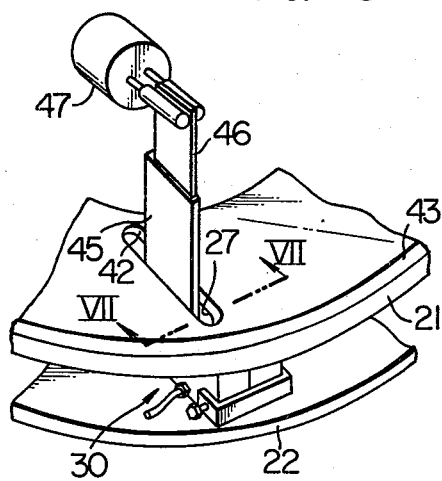
FIG. 5 is a perspective view of a part of a stay ring under manufacture, showing the manner of an electroslag welding effected in the space in the mold.

Subsequently, the upper and the lower annular discs 21 and 22 are located, with the required space, i.e. a distance substantially equal to the height of the stay vane 23, left therebetween. Then, a plurality of molds generally designated at a reference numeral 30 in FIG. 6 are placed at predetermined position between the spaced upper and the lower annular discs 21 and 22, in a manner as shown in FIGS. 5 and 7.

Figure 6:
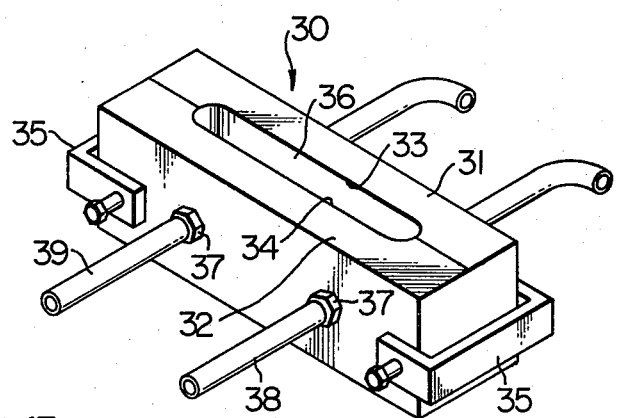
FIG. 6 is an enlarged perspective view of an example of the mold as used in carrying out the method of the invention.

As will be most clearly seen from FIG. 6, the mold 30 is of split type having two separable sections 31 and 32, each of which has a recess 33, 34. These recesses 33, 34 in combination define a space 36 having a shape corresponding to that of the vane 23, when the two sections 31 and 32 are brought together and held unitarily with each other by means of clamps 35. A pair of fittings 37 are screwed into each section 33 (34) of the mold 30, to which connected are an inlet circuit pipe 38 and an outlet conduit pipe 39 as illustrated, so that a cooling fluid may be circulated through a passage 40 formed, as shown in FIG. 7, in each mold section 33 (34).

Figure 7:
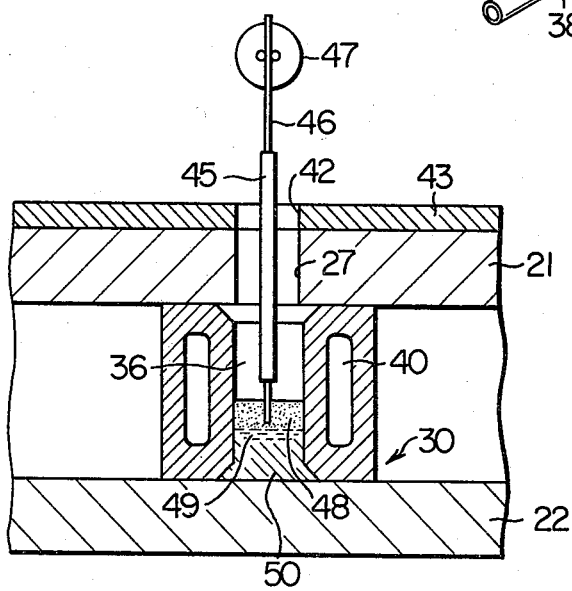
FIG. 7 is a sectional view taken along the line VII—VII of FIG. 5.

As will be seen from FIG. 7, the space 36 is held in alignment and in communication with the corresponding opening 27 formed in the upper annular disc 21, as each mold 30 is properly situated at the predetermined position between the upper and the lower annular discs 21 and 22.

Then, an annular or disc-shaped plate member 43 having openings 42 each of which corresponds in shape and size to the opening 27 of the upper annular disc 21 is placed on the upper annular disc 21, such that the openings 42 are aligned to the respective openings 27 of the upper annular disc 21.

After placing the plate member 43, an electroslag welding is effected into the space 36 of each mold 30, in the following manner.

A consumable nozzle 45 of the electroslag welder is inserted into the space 36 in the mold 30, through the opening 42 in the disc-shaped plate member 43 and through the opening 27 in the upper annular disc 21. A consumable plate electrode 46 is continuously fed by a feed motor 47, while guided by the nozzle 45. The electrode 46 is continuously melted by the heat generated by an electric current passing through the electrode 46 itself, molten slag 48 and molten metal 49, so as to fill the space 36 in the mold and at least a portion of the space defined by the openings 27 and 42 in the upper annular disc 21 and the disc-shaped plate member 43.

The molten metal 49 is successively solidified as it is cooled by the cooled wall of the mold 30, as denoted by a reference numeral 50.

It will be seen that the stay vane 23 is formed and, at the same time, the upper and lower annular discs 21 and 22 are rigidly connected to each other through the formed stay vane 23, as the electroslag welding in the space 36 of the mold 30 is completed.

Finally, the mold 30 and the disc-shaped plate member 43 are removed, and the part of the welding metal solidified in the space of the opening 42 in the disc-shaped plate member 43 is removed by a mechanical processing.

Figure 8:
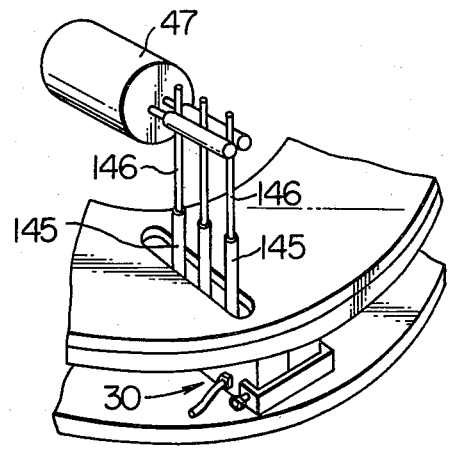
FIG. 8 is a similar view to FIG. 5 but showing consumable electrode wires used in place of the consumable plate electrode as shown in FIG. 5.

It will be clear to those skilled in the art that the use of the consumable plate electrode is not exclusive and other forms of consumable electrodes can fairly be used. For instance, the consumable plate electrode can be substituted by a plurality of consumable wires 146 guided by consumable nozzles 145, as shown in FIG. 8. In such a case, as will be seen from FIG. 8, the consumable wires 146 are continuously fed into the mold cavity 36, by means of the feed motor 47, through the guides of respective consumable nozzles 145. However, from an economical point of view, the use of the plate electrode is preferred and recommended.

According to the described method of the invention, the formation of the stay vanes and the fixing of the upper and the lower annular discs to each other are effected simultaneously by an electroslag welding effected into the spaces in the molds, so that an increased efficiency of the manufacturing work is ensured. In fact, according to the method of the invention, the time required for completing a stay ring is one tenth as short as that required by conventional methods.

At the same time, according to the invention, a high quality of the stay ring can be produced without substantial difficulty, even when the distance between the upper and lower annular discs is small, because the consumable electrodes are fed through the openings formed in the upper annular disc.

In addition, it is possible to further improve the efficiency of the work, by automatically performing the electroslag welding.

From the foregoing description, it will be seen that the method of the invention is especially useful in manufacturing such stay rings having a small distance between the upper and lower annular discs as those for water turbines adapted for use under a large fall. However, needless to say, the method of the invention can equally be applied to the manufacture of the stay rings having relatively large distances between the upper and lower annular discs.

Figure 9:
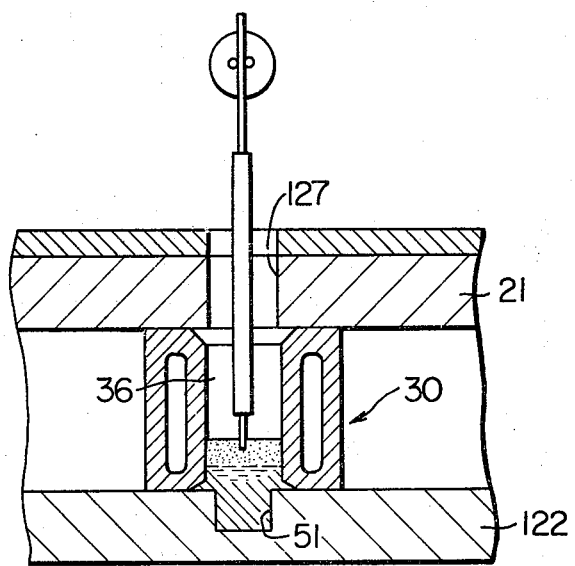
FIG. 9 is a view similar to that of FIG. 7, in which a lower annular disc is modified to have recesses formed therein.

FIG. 9 shows a modification of the lower annular disc in which same members and parts to those of the foregoing embodiment are denoted by the same reference numerals.

In this embodiment, as will be clearly seen from FIG. 9, recesses 51 are formed in the surface of the lower annular disc 122, at locations where the stay vanes 23 are to be secured. Each recess has a form substantially conforming to the cross-sectional shape of the stay vane 23. When the upper and lower annular discs 21 and 122 are placed at the predetermined distance from each other, the recesses 51 formed in the surface of the lower annular disc 121 are brought into vertical alignment with the corresponding openings 27 of the upper annular disc 21. In addition, as the molds 30 are correctly located between the upper and lower annular discs 21, 122, the spaces 36 in the molds are respectively brought into communication with the openings 27 in the upper annular disc 21 and the recesses 51 in the lower annular disc 122. Due to the provision of the recesses 51, the area of welding is increased to afford a larger strength of the connection between the stay vane 23 and the lower annular disc 122.

Figure 10:
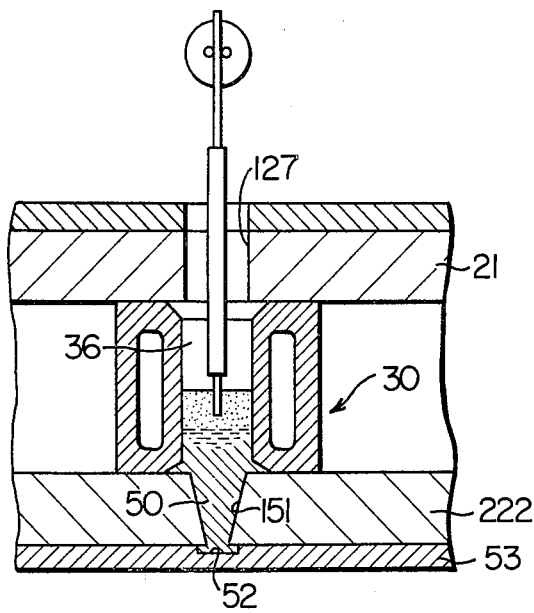
FIG. 10 is a view similar to that of FIG. 7, in which the lower annular disc is modified to have openings formed therein.

FIG. 10 shows another modification of the lower annular disc. In FIG. 10, same members and parts to those of the foregoing embodiments are denoted by the same reference numerals. The lower annular disc 222 as shown in FIG. 10 is provided, at locations where the stay vane 23 are to be placed, with slots or openings 51 of a shape substantially corresponding to the cross-sectional shape of the stay vane 23. The openings 51 of the lower annular disc 222 are held in vertical alignment with the corresponding openings 27 of the upper annular disc 21, when two annular discs are positioned at the predetermined distance from each other. Further, when the molds 30 are correctly situated between the upper and lower annular discs 21, 222, the spaces in the molds are kept in communication with corresponding openings 27, 151 in the upper and lower annular discs.

In advance to the execution of the electroslag welding, an annular or disc-shaped plate member 53 having recesses 52 formed at locations corresponding to the openings 151 in the lower annular disc 222 is placed in contact with the lower face of the lower annular disc 222, so as to close the openings 151 in the latter.

The openings 151 serve to increase the areas of welding to ensure a larger mechanical strength of the welding connection between the stay vanes to be formed and the lower annular disc 222. In addition, since the degraded welding which inevitably takes place at the starting of the welding is effected in the space of the recess 52, the degraded welding is completely excluded from each region of welding between the wall of the opening 151 and the welding metal 50, so as to further ensure the mechanical strength of the welding connection.

Figure 11:
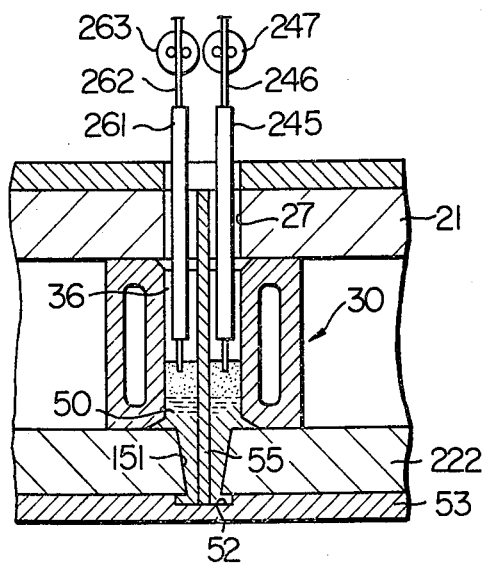
FIG. 11 is a view similar to that of FIG. 7, showing another embodiment incorporating a core member placed in the space of the mold.

FIG. 11 shows another embodiment of the invention, in which same members and parts to those of the embodiment illustrated in FIG. 10 are denoted by the same reference numerals.

According to this embodiment, a core metal 55 is inserted into the space formed by the recess 52 in the plate member 53, opening 151 in the lower annular disc 222, space 36 in the mold and the opening 27 in the upper annular disc 21, so as to divide the space substantially into two sections. Consumable nozzles 245, 261 are inserted into the two sections, respectively, and consumable plate electrodes 246, 262 are respectively fed into the two sections through the guide of the consumable nozzles 245, 261 by feed motors 247, 263. Thus, electroslag weldings are effected simultaneously in two sections of the space. It will be understood by those skilled in the art that this embodiment brings about advantages of reduced cost of manufacture and shortened time of work, because the amount of the welding metal 50 can be considerably saved due to the presence of the core metal 55.

What is claimed is:

1. A method of manufacturing a stay ring for use in a water turbine and a pump turbine, the stay ring having an upper annular disc and a lower annular disc and a plurality of circumferentially spaced stay vanes each extending between the upper and the lower annular discs, comprising the steps of:

providing upper and lower annular discs;

forming openings in at least the upper annular disc of said upper and lower annular discs at each of the uniformly peripherally spaced locations where said stay vanes are to be positioned;

locating said upper and lower annular discs in a spaced parallel relation to each other with a fixed distance therebetween;

placing a plurality of molds, each having therein a space of a shape conforming to the shape of said stay vane, at fixed positions between said upper and lower annular discs, such that said spaces in the molds are put into communication with corresponding ones of said openings in said upper annular disc;

thereafter effecting an electroslag welding in each of said spaces in the molds by passing a consumable electrode through associated openings in said upper annular disc and into corresponding mold spaces to first bond electroslag molten metal material to said lower annular disc, to second fill said space in the mold with electroslag molten metal material, and third to bond the electroslag molten metal material to said upper annular disc and at least fill a portion of a space defined by the associated opening in said upper annular disc with electroslag molten metal;

thereafter cooling and solidifying said electroslag deposited molten metal filling said spaces in the molds to form said stay vanes and, at the same time, to permanently and rigidly connect said upper and lower annular discs through the thus formed stay vanes; and thereafter removing said molds from said stay vanes respectively by disassembling each mold into a plurality of pieces.

2. A method as claimed in claim 1, further comprising a step of forming recesses in said lower annular disc at locations where said stay vanes are to be positioned, in advance to said step of locating said upper and lower annular discs, wherein said step of locating the upper and lower annular discs in a spaced relation to each other is effected such that said openings in said upper annular disc are vertically aligned with corresponding recesses of said lower annular disc, while said step of placing the mold between the upper and the lower discs is carried out such that said spaces in the molds are held in communication with corresponding openings of said upper annular disc and corresponding recesses of said lower annular disc.

3. A method as claimed in claim 2, wherein each of said recesses formed in said lower annular disc has a shape substantially conforming to the cross-sectional shape of said stay vane.

4. A method as claimed in claim 1, further comprising a step of forming a plurality of openings in said lower disc at locations where said stay vanes are to be positioned, prior to the step of locating said upper and lower annular discs in a spaced relation, wherein said step of locating said upper and lower annular discs in a spaced relation is effected such that said openings in said upper annular disc are put into vertical alignment with corresponding openings in said lower annular disc, while said step of placing said mold between said upper and lower annular discs is carried out such that said spaces in the molds are brought into communication with corresponding openings in said upper and lower annular discs, said method further comprising a step of placing a plate in contact with the lower side of said lower annular disc to close said openings of said lower annular disc, before the step of effecting said electroslag welding.

5. A method as claimed in claim 4, wherein said openings in the lower annular discs each has a shape corresponding to the cross-sectional shape of the stay vane.

6. A method as claimed in claim 4 or 5, wherein said plate is provided therein with a plurality of recesses adapted to be put in communication with corresponding openings in said lower annular disc when said plate is put in contact with the latter.

7. A method as set forth in claim 1, 2, 3, 4 or 5, further comprising a step of placing at least one core member in each of said spaces in the molds to divide the space in each mold into at least two sections, wherein said step of effecting said electroslag welding is effected for each of said sections of the space in each mold.

8. A method as claimed in claim 1, 2, 3, 4 or 5, wherein each of said openings in said upper annular disc comprises a plurality of apertures formed through the thickness of the latter.

9. A method as claimed in any one of claims 1, 2, 3, 4 or 5, wherein each of said openings in said upper annular disc has a configuration well conforming to the cross-sectional shape of said stay vane.

* * * * *